Figure 1:
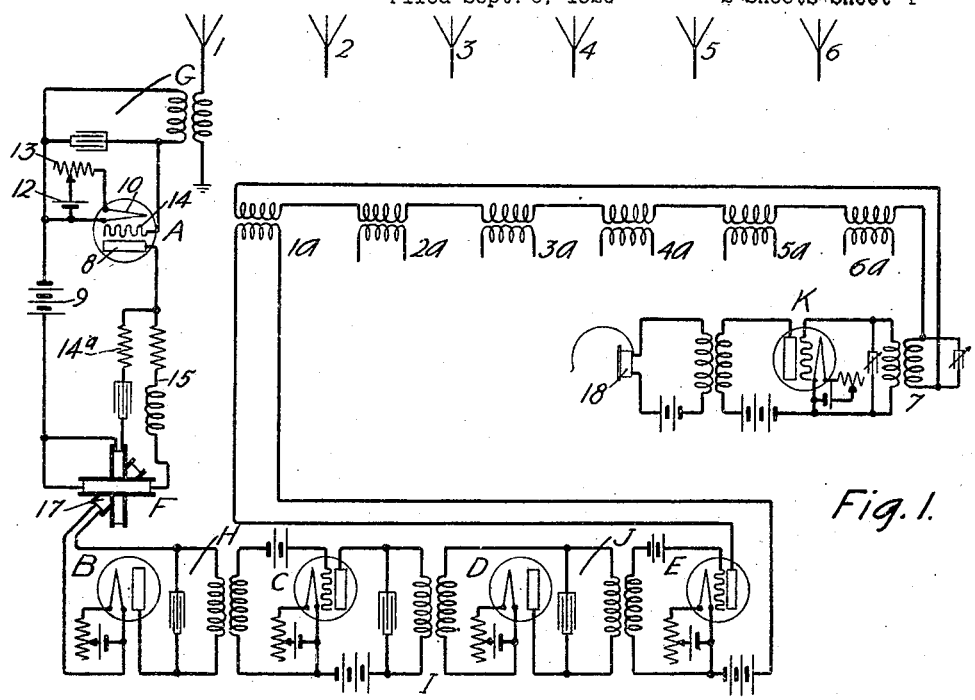

March 15, 1927.

R. A. HEISING

DIRECTIVE RADIO RECEIVING SYSTEM

Filed Sept. 8, 1920   2 Sheets-Sheet 1

1,620,655

Inventor:
Raymond A. Heising.
by C. A. Sprague,
Att'y.

March 15, 1927.  R. A. HEISING  1,620,655
DIRECTIVE RADIO RECEIVING SYSTEM
Filed Sept. 8, 1920  2 Sheets-Sheet 2

Inventor:
Raymond A. Heising
by C. C. Sprague
Att'y.

Patented Mar. 15, 1927.

1,620,655

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

DIRECTIVE RADIO RECEIVING SYSTEM.

Application filed September 8, 1920. Serial No. 408,889.

This invention relates to a directive radio receiving system and has for an object the provision of a system whereby "strays" or signals from other than the desired direction may be largely eliminated.

A further object is to provide a form of receiving system which is highly directive and is responsive to signals received from directions included in a relatively small angle.

This invention is the result of an effort to devise a relatively simple and inexpensive means for the elimination of "strays" and the disturbance in radio receiving which they cause. It is recognized that the real solution of the problem resides in the development of a directive receiving system. By such a system is meant a system in which the strength of signals from a direction in which it is desired to receive is great as compared with the strength of signals received from other directions, and in which the gradation of strength of signal from the direction in which it is a maximum to the direction in which it is a minimum is very rapid, so that the system is effective through only a small range of angular distance. The phenomenon is somewhat analogous to the condition of "sharp" tuning of receiving circuits.

A further object of the invention is the provision of a system for determining the direction of a transmitting station from which a signal is being received.

It has been proposed to erect a large number of antennæ to spread over a wide area and with circuits so connected that the signals received on all the antennæ add only when they come from a certain direction, and that when they come from other than that given direction the phase differences of waves in adjacent antennæ will cause interference therebetween and the resulting waves will partly or entirely neutralize each other. In receiving long waves, or waves of the usual length, by such a system it would be necessary to build a series of antennæ, probably in a straight line, a distance of ten to a hundred miles in length. The cost of such a system together with the difficulties in collecting the received signals from all of them would be quite great. The present invention overcomes, in a large measure, these difficulties since by its use it is possible to arrange a great many receiving antennæ within the space of a wave length.

This result is secured by a conversion of the fundamental of the received wave into harmonics and the utilization of an arrangement of circuits by means of which interference is secured between these harmonic waves, thus using for selectivity a multiple antenna system which is adapted for shorter waves, while at the same time a longer wave is being received. This results in obvious advantages, among which may be noted the greater compactness of the system.

Accordingly, a still further object of my invention is to provide a novel arrangement of multiple antenna receiving systems characterized by compactness, simplicity, and convenience.

Figure 3:
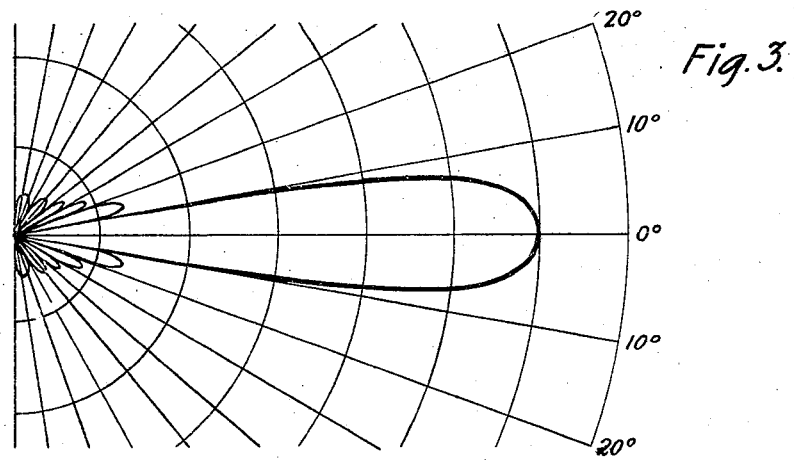
Figure 2:
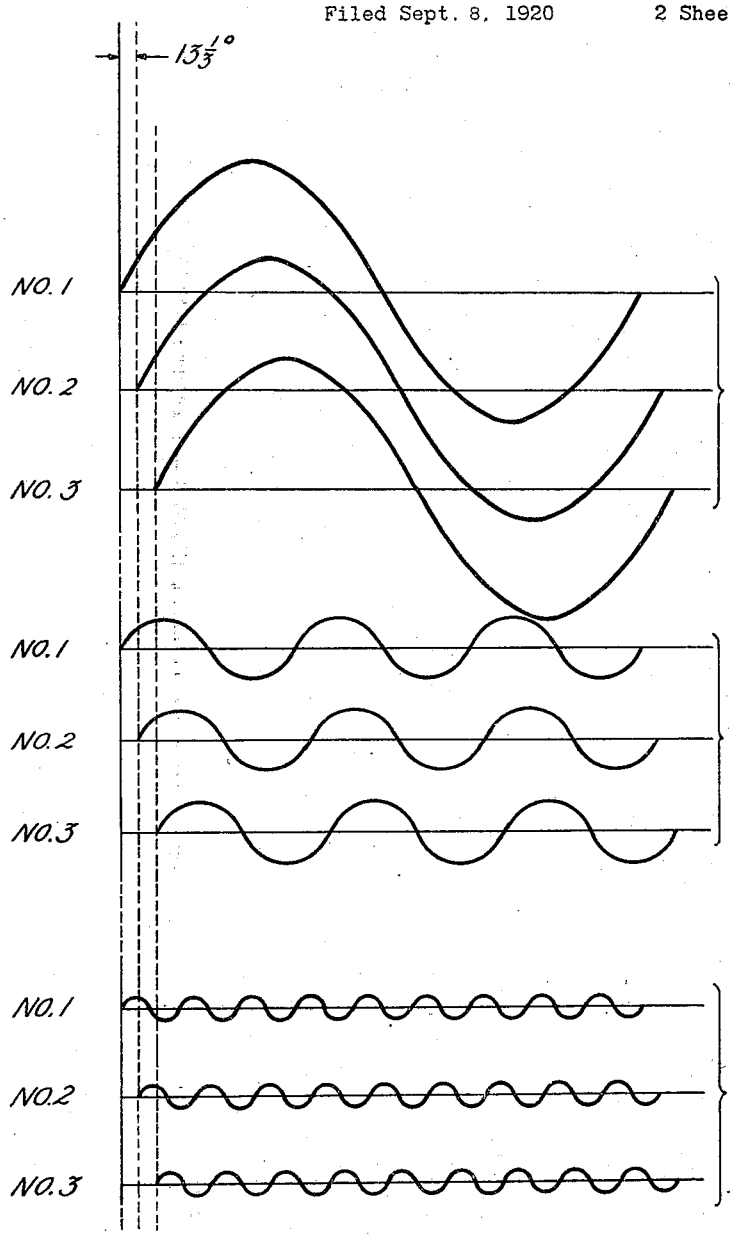

Some objects of the invention having been stated, there will now follow a detailed description of the structure and operation of a preferred embodiment, reference being made to the drawing in which Figure 1 shows diagrammatically an arrangement of circuits for the accomplishment of the invention. Figure 2 shows a series of wave forms illustrating the successive steps in the breaking down and analysis of the incoming wave by means of the invention. Figure 3 indicates, in polar coordinates, the results attained by the use of the system of the invention.

In Figure 1 is shown a series of receiving antennæ 1, 2, 3, . . . . . which are spaced uniformly in a line. These antennæ may be either loops or ordinary antennæ, the particular type being immaterial, although the antennæ should be substantially duplicates of each other. It is not necessary that the direction of this line be perpendicular or parallel to the direction from which it is desired to receive the signal or that it make any particular angle with this direction, since it will be shown later that the circuits can be arranged to receive signals from any desired direction. Each one of these antennæ circuits may be connected through a series of vacuum tubes A, B, C, D and E, phase shifting device F, the tuned circuits G, H, I and J and the common detecting circuit in which is included the detecting device K.

The incoming signals are received by antennæ 1, 2, 3, . . ., transmitted through the series of devices as above described and to a set of detecting circuit transformers 1ª, 2ª, 3ª . . .; the secondaries of which are in series and in series with the primary of transformer 7 to the secondary of which the detector K is connected. Figure 1 of the drawing shows in detail only the common detecting means and the circuits connected to a single one of the antennæ, the circuits connected to the remaining antennæ being duplicates of the circuits shown.

The incoming waves impinge on the several antennæ and electromotive forces are induced therein of a form conveniently shown as sine waves in the upper group of wave forms in Figure 2, which shows the waves corresponding to three adjacent antennæ. These waves will be displaced from each other in phase to a degree dependent on the direction of the incoming signals and the distance between the antennæ. These antennæ may be spaced a small fraction of the wave length apart and preferably a whole number to the wave length, although not necessarily so. The entire number need not occupy an interval greater than one-half of the wave length of received signals.

The antenna is tuned to the received signal in the usual manner by circuit G, which it is considered unnecessary to explain in further detail. The signal is then passed into the amplifier A. This may be any one of the devices used for this purpose and I have indicated conventionally a common arrangement of circuits therefor. The received signal wave is impressed on the grid, or input circuit. The output circuit comprises plate or anode 8, phase shifter F, to be hereinafter described, battery 9 and filament or cathode 10 which is energized by means of the usual battery 12 which is in series with rheostat 13. The grid is designated by reference number 14. Amplifiers C and E may be duplicates of the amplifier described above and the description of the first will therefore suffice for each.

The amplified current is sufficient to operate phase shifter F. The function of the phase shifter in the system will be explained later, but it is pointed out here that it may be a usual type for single phase circuits and may consist of a device having two stationary field coils energized through parallel circuits 14 and 15 which contain respectively capacity and inductance. The structure so far described may be identical with that of a split phase motor in which a revolving flux is produced by a split phase winding which revolving flux tends to cause an armature to rotate. The rotor, or armature, 17 in this case is locked in position and there is therefore induced in its winding, by generator action, an electromotive force, the phase of which is displaced from that of the amplified received wave which is impressed on the stator circuits by an angle depending upon the angular position in which the rotor is fixed.

The signal current passes from the phase shifter F to rectifier B. Although this vacuum device is here designated a rectifier, its function is that of a harmonic generator. The rectification produces a wave form which has one or several odd harmonics. Such a result may be secured, for example, by overloading the rectifier. The rectifier shown is a simple two element type of vacuum tube and the arrangement of its circuits is thought sufficiently obvious from the drawing without further explanation. The third harmonic (triple frequency) component is selected by circuit H tuned thereto and transmitted to a second amplifier C. It is assumed that only the third harmonic is selected at H, although, as will appear later, the invention is not necessarily so limited.

Amplifier C is identical with that shown at A, and reference is made to the description thereof for a detailed disclosure of its structure.

The wave from tuned circuit H and amplifier C is of the form shown in the middle group of curves in Fig. 2, which illustrates third harmonics (triple frequencies) of the respective fundamentals shown in the upper group, the three curves in the middle group corresponding respectively to the harmonic producers, similar to the device B, disclosed in three adjacent antennæ circuits.

The amplified wave is passed through the second rectifier D which functions in the same manner as device B to produce harmonics, the third of which is selected by circuit H tuned thereto. This third harmonic is shown in the lower group of Figure 2 and corresponds in frequency with the ninth harmonic of the fundamental. This ninth harmonic is passed through amplifier E. From amplifier E the wave may be passed through as many further rectifications and amplifications as desired, each succeeding step resulting in the production and selection of a wave which is the third harmonic of the wave immediately preceding. The drawing discloses a system in which the final product is a ninth harmonic. This wave is combined with the corresponding waves from the remaining antennæ by means of transformers 1ª, 2ª, 3ª . . ., the current of the resulting wave form flowing in the circuit which contains the primary of transformer 7.

By means of this transformer the signal is transmitted to detecting tube K which is shown conventionally as having the same circuit arrangement as the three element devices used as amplifiers. The use of the three-element tube as a detector is well known and needs no further description. The signals are read by means of a device 18 which may be the usual telephone receiver.

Having described a complete unit of the receiving system as related to a single antenna I will now proceed to describe the system as a whole and the cooperation of the related elements in the peculiar manner which constitutes my invention.

It is desired to receive signals from a certain direction. For the reasons which will be apparent later it is important that the signal waves from this direction induce electromotive forces in the antennæ which are in phase with each other. This could be accomplished by bodily moving the whole series of antennæ, if this were practicable, until the line joining the antennæ was perpendicular to the direction of the received wave. Since the position of the antennæ must remain fixed an equivalent result is accomplished by means of the phase shifters in the several antenna circuits by means of which the electromotive forces induced in the secondaries of the phase shifters are brought into phase with each other by proper adjustment of each phase shifter. In this case the third and the ninth harmonics of the several receiver circuits will also be in phase and the resultant current in the detector will be the arithmetic sum of the ninth harmonics, or, in the case in which there are three antennæ the amplitude of the resultant wave will be three times the amplitude of one of the harmonics shown at the bottom of Figure 2 and the frequency will be nine times the fundamental frequency.

Assume now that signals from any other direction are received and assume that the direction is such that the waves generated in the antennæ by these waves and transmitted to the secondaries of the phase shifters are displaced from each other by 13⅓ degrees as shown in Figure 2. The third harmonics will be displaced from each other by 40 degrees, as shown in the middle group of Figure 2 and the ninth harmonics will be displaced from each other by 120 degrees as shown at the bottom. The three ninth harmonics will then, in the detecting circuit, add to zero and there will be complete interference. Therefore, if the three fundamental waves are displaced from each other by 13⅓ degrees or by any multiple of 13⅓ degrees, the ninth harmonics will add to zero. For directions corresponding to other displacements the detected current will have a value intermediate its maximum and zero values.

If instead of confining ourselves to the ninth harmonic, we add more rectifiers and tuned circuits and generate as high as twenty-seven, eighty-one, or even higher harmonics, we can secure the condition that these harmonics will add up to zero except in the immediate neighborhood of the region where all of the fundamentals are in phase.

The conversion of the fundamental into higher harmonics, and therefore shorter waves, results in the advantage of using the multiple antennæ system for selectivity which shorter waves give (a small space only being required) while, at the same time, a long wave is being received. It has been found desirable in a system of this kind to make the distance between antennæ 1, 2, 3 . . ., approximately one-half the wave length of the harmonic impressed on the detector. Accordingly, if a wave length of 6,000 meters is being received with this system and this 50,000 cycle note is converted into its eighty-first harmonics the effective wave length which is being used for producing the selectivity will be 74 meters and the antennæ should be located 37 meters apart. Figure 3 shows a typical reception curve for a twelve antennæ arrangement with the distance between antennæ equal to one-half the detected wave length and with the antennæ arranged in a straight line. The other half of the curve is symmetrical with that shown. The radii vectors are proportional to strength of signal or current in the detector. Keeping in mind the relation that the distance between antennæ is equal to one-half the detected wave length and that the total range of antennæ occupies one-half the fundamental wave length, it is apparent that the number which identifies the frequency multiplication between the fundamental wave and the finally detected wave also indicates the number of antennæ included within one-half of the fundamental wave length. It is also pointed out that for an assumed phase angle between the fundamental waves, the multiplication of frequency necessary to give the desired 120 degree phase angle between the harmonics is equal to the ratio between 120 degrees and said assumed phase angle. For example, in the case illustrated in the drawing there is a multiplication of nine, which is the ratio between 120 degrees and the 13⅓ degree phase angle between the fundamental waves. Since this angle of displacement between fundamental waves corresponds to the condition of complete interference between the harmonic waves and since there will be complete interference also for any multiple of that displacement, it is apparent that there will be as many lobes in the curve as there are antennæ. In the case illustrated by Figure 3, the width of the reception band is 20 degrees. In a twenty-four antennæ system there would be a 10 degree reception band with much greater reduction in signals from other directions, the directivity (or selectivity) being therefore greater and the disturbance less in inverse ratio to the number of antennæ. The maximum radius of the curve corresponds to the direction in which the waves from the several antennæ are in phase. In the case described, in which the ninth harmonic was detected, this amplitude would be the amplitude of the sum of nine superposed ninth harmonic waves.

The relation pointed out in the paragraph above may perhaps be better understood by making use of the principle, elsewhere explained, that by the use of the frequency multiplication feature the spacing between adjacent antennæ may be based on a fictitious value of incident wave frequency equal to that of the harmonic used, instead of the fundamental frequency as in the more common type of directive receiving systems, with resultant smaller spacing. In the case considered, in which the spacing is half the wave length of the final harmonic and the balance is obtained between the harmonics, the conditions, so far as function is concerned, are substantially the same (although much greater selectivity can be secured) as if the antennæ were spaced apart at intervals of one-half the fundamental wave length, and balance were effected between the fundamental waves. For example, in the latter arrangement the detected current would change from a maximum, when the direction of incident waves was normal to the antenna system, to zero at points 90 degrees on either side, that is, for a spacing of one-half the fundamental wave length there would be two complete lobes in the directivity curve. Similarly, in the former case there are two complete lobes corresponding to each detected wave length. Since each pair of antennæ occupy one-twelfth as much space as in the other case, there are twelve times as many lobes in the complete circle. It is noted that an increase or decrease of antennæ without changing the spacing would not change the curve in Fig. 3, except as to amplitude of detected current and hence the lengths of the radius vectors of the several lobes.

In the system described with reference to Fig. 2, rectifiers are caused to generate a wave containing a third harmonic and the tuning circuits are tuned for this harmonic. It should be understood that the system described is illustrative only and that a different order of harmonic could be used, or even that successive tuned circuits in the unit associated with an antenna may be tuned to different frequencies. For example, if the final product is intended to be a forty-eighth harmonic, i. e., a harmonic having forty-eight times the fundamental frequency, the successive tuned circuits and harmonic generators may be adapted respectively for the third, fourth and fourth harmonic, or this order may be varied as desired. It is not even necessary that the relation of the several harmonics be the same in the different units or that they have everything in common except the final frequency. For example, in a second unit the tuned circuits may be adapted for the second, second and twelfth harmonics respectively, the final product being the same as the case of the first mentioned unit. The twelve antennæ arrangement of Fig. 3 is adapted for second and third harmonic production.

Although this invention has been described with particular reference to a specific circuit arrangement, it should be understood that all of its features are not restricted to such use and that the invention is not so limited, but is limited in scope only by the appended claims.

What is claimed is:

1. The method of eliminating undesired energy in a multiple antenna receiving system which consists of impressing waves on such system so that the portions of the impressed wave incident on successive antennæ differ slightly in phase, causing a uniform shift of phase of such incident waves so that there is a substantially greater difference of phase therebetween, combining the resultant waves, and detecting the combination wave.

2. The method of directive wave reception which comprises receiving waves at a plurality of separated points, deriving harmonic waves therefrom whereby the harmonic waves produced at said points differ in phase by relatively greater amounts than the waves received at said points, and combining said harmonic waves to neutralize the effects of certain of said received waves.

3. The method of eliminating undesired energy in a receiving system comprising a plurality of linearly arranged antennæ feeding, through individual receiving circuits, into a common detecting circuit, which consists in operating on the waves generated in the receiving antennæ to produce harmonics and selecting out a corresponding harmonic in each receiving circuit whereby there is effectively caused a phase shift in said waves in adjacent receiving circuits, and combining these harmonics in the common detecting circuit.

4. The method of securing selectivity of received signals in a multiple antenna receiving system which consists in carrying the wave form in each receiving antenna through several series of operations, each series of which consists of the three steps of converting the wave into a wave containing harmonics, selecting a harmonic and amplifying the harmonic selected out, and finally combining the end products of the last series of operations in each receiving circuit in a common detecting circuit whereby there may be complete interference between the higher harmonics of the received waves in the detector circuit even though the phase difference between waves in the receiving antenna is slight.

5. In a directive radio receiving system a plurality of antennæ in spaced relation, a receiving circuit associated with each said antenna, a frequency multiplying means in each said receiving circuit whereby the multiplied frequency waves differ in frequency by relatively greater amounts than the waves received by said antennæ, and a means for combining said multiplied waves to neutralize the effects of certain of the received waves.

6. A directive radio receiving system comprising a multiple antenna array, a wave transmitting circuit related to each antenna, and a detector conected in common to said circuits, said transmitting circuits each including a means for deriving from the received wave a harmonic frequency wave, said harmonic frequencies being the same for all of said circuits, and means for impressing said harmonic waves on said detector.

7. A directive radio receiving system comprisng in combination an antenna array, a receiving circuit connected to each antenna of the array, amplifying and frequency multiplying means connected to each of said receiving circuits whereby the phase differences between the waves after multiplication are greater than those between the received waves, a detecting device, and means for impressing the product waves from said means in common on said device, the frequency multiplication being the same for each of said circuits and the antennæ being spaced apart a distance equal substantially to half the wave length of the harmonic waves.

8. A directive radio receiving system as disclosed in claim 7 in which the intermediate means includes means for varying the direction of maximum selectivity.

9. A radio receiving system comprising an array of at least three uniformly spaced and linearly arranged antennæ, receiving circuits individual to each antenna, and a common detecting circuit for said antennæ and receiving circuits, all of the antennæ being comprised within a space of a single wave length of received waves and said receiving circuits including means, adjustable relatively to the spacing of said antennæ, whereby the system is selective substantially uniquely to waves incident thereon from a given direction.

10. A radio receiving system comprising an array of linearly arranged, uniformly spaced antennæ more than two in number, a common detecting means, and means whereby the waves incident on said antennæ from a desired direction may act cumulatively on said detector to the substantial exclusion of waves from all other directions, the interval between adjacent antennæ being small as compared with one-half the wave length of the received waves.

11. A radio receiving system comprising an array of at least three linearly arranged uniformly spaced antennæ, a common detecting means therefor, and means whereby the waves incident on said antennæ from a desired direction may act cumulatively on said detector to the substantial exclusion of waves from all other directions, including means whereby the interval between adjacent antennæ may be independent of the wave length of received waves, said means comprising a frequency changing device in each of the paths between the antennæ and said common detector.

12. In a multiple antenna receiving system in combination, a plurality of receiving antennæ, a common detecting circuit, and a connecting circuit between each of the receiving antennæ respectively and the detecting circuit, each of said connecting circuits containing a phase shifting means whereby waves incident on said antennæ from any desired direction may be caused to act cumulatively on the detector, and each of said connecting circuits also containing wave transforming means whereby the effects of the waves incident on the antennæ from any other direction are substantially completely balanced out in the detecting circuit.

13. In a multiple antenna receiving system for selective receiving, a plurality of receiving circuits feeding into a common detecting circuit, each of said circuits including in cascade relation, a receiving antenna, an amplifying device, a phase shifting device, a harmonic generator, a tuned circuit adapted to be tuned to the received wave and a second amplifying device, whereby interference may be caused in the detecting circuits between harmonics of received waves which emanate from a predetermined direction.

14. A system as disclosed in claim 13 characterized by the inclusion in each of the receiving circuits of a plurality of sets each consisting of a harmonic generator, a tuned circuit, and an amplifier arranged serially in the order named.

15. In a system for changing phase differences by frequency conversion, the combination with a plurality of sources of separate out of phase alternating potentials of known frequency, of means connected with each source to produce harmonics of the said known frequency, means to select a predetermined harmonic of the said known frequency from each of the said sources, and translating means upon which the selected harmonic from each source is impressed.

16. The method of changing the phase difference between a plurality of separate out of phase currents of the same known frequency which consists in creating from the separate currents harmonics of the said known frequency, selecting the same harmonic from each group thus created and combining the currents of the selected harmonic frequency.

In witness whereof, I hereunto subscribe my name this 2nd day of September A. D., 1920.

RAYMOND A. HEISING.